(12) United States Patent
Contractor

(10) Patent No.: US 6,792,081 B1
(45) Date of Patent: Sep. 14, 2004

(54) EMERGENCY NOTIFICATION SYSTEM

(75) Inventor: Sunil H. Contractor, Marietta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/995,142

(22) Filed: Nov. 27, 2001

(51) Int. Cl.$^7$ .......................................... H04M 11/22
(52) U.S. Cl. ................. 379/45; 379/37; 379/41
(58) Field of Search ................. 379/37–51, 221.08; 370/352

(56) References Cited

U.S. PATENT DOCUMENTS

| | | | |
|---|---|---|---|
| 5,438,568 A | 8/1995 | Weisser, Jr. | |
| 5,452,350 A | 9/1995 | Reynolds et al. | |
| 5,590,188 A | 12/1996 | Crockett | |
| 5,727,057 A | 3/1998 | Emery et al. | |
| 5,740,237 A | 4/1998 | Malik et al. | |
| 6,038,451 A | 3/2000 | Syed et al. | |
| 6,128,481 A | 10/2000 | Houde et al. | |
| 6,201,856 B1 * | 3/2001 | Orwick et al. | 379/40 |
| 6,208,854 B1 | 3/2001 | Roberts et al. | |
| 6,295,346 B1 | 9/2001 | Markowitz et al. | |
| 6,301,349 B1 | 10/2001 | Malik | |
| 6,427,001 B1 * | 7/2002 | Contractor et al. | 379/45 |
| 6,442,241 B1 | 8/2002 | Tsumpes | |
| 6,608,886 B1 | 8/2003 | Contractor | |

OTHER PUBLICATIONS

U.S. patent application Ser. No. 09/997,348, filed Nov. 29, 2001.
U.S. patent application Ser. No 10/457,684, filed Jun. 9, 2003.
U.S. patent application Ser. No. 09/997,098, filed Nov. 29, 2001.
International Application No. PCT/US02/36763 filed Nov. 14, 2002.
U.S. patent application Ser. No. 09/997,096 filed Nov. 29, 2001.

* cited by examiner

Primary Examiner—Melur Ramakrishnaiah
(74) Attorney, Agent, or Firm—Kirkpatrick & Lockhart LLP

(57) ABSTRACT

An emergency notification system. The system includes a first server for receiving an emergency communication from a telecommunications network and for transmitting a message to a subscriber of the emergency notification system. The system also includes a second server in communication with the first server, the second server for supplying the first server with information associated with a subscriber.

8 Claims, 5 Drawing Sheets

EMERGENCY NOTIFICATION SYSTEM

BACKGROUND OF INVENTION

1. Field of Invention

The present invention is directed generally to notification systems, and, more particularly, to an emergency notification system.

2. Description of the Background

In today's society, there are increasing numbers of people who work at locations other than their homes. In many instances, there are young children who spend considerable amounts of time at home without adult supervision while their parents are working. Such situations can be very stressful to a working parent because of the uncertainty of knowing exactly what the unsupervised children may be doing. There are also a growing number of people who have elderly parents living alone. Understandably, there are many people who, for various reasons, desire to be notified as soon as possible if an emergency call is placed from a location that concerns them.

One service that has attempted to address this desire is the family 911 notification service offered by Lucent Technologies Inc., Murray Hill, N.J. Each subscriber to the service may select up to five telephone numbers, each associated with a particular person, that they wish to be called if a 911 call is placed from a landline telephone associated with the subscriber. The selected telephone numbers may be given a priority from first to fifth and may be associated with landline telephones and/or wireless telephones. The service operates in the manner described hereinbelow.

After a 911 call has been placed from a landline telephone associated with a subscriber, the service calls the selected telephone numbers in a sequential order according to the specified priority. If the family 911 notification service reaches a live person at one of the selected telephone numbers, the service plays an announcement. The announcement informs the person that the incoming call is from the family 911 notification service and that a 911 call was placed. The announcement also informs the person as to the time that the 911 call was placed and the telephone number that the 911 call was placed from. The service stops calling the selected telephone numbers once the information has been provided to a live person. If the service has not reached a live person after all of the selected telephone numbers have been called, the service waits for five minutes before beginning to call the selected telephone numbers again. This process repeats itself for the first hour following the placement of the 911 call. During the first hour, if the service reaches an answering machine or a voice mail system at one of the selected telephone numbers, the service does not play an announcement.

If the service has not reached a live person within the first hour, the service continues to call the selected telephone numbers according to the specified priority. However, if the service reaches an answering machine or a voice mail system after the first hour, the service plays a slightly different announcement. This announcement informs the answering machine or voice mail system that the incoming call is from the family 911 notification service and that the service has been trying to reach the person associated with the selected telephone number to notify them that a 911 call has been placed. This announcement also informs the answering machine or the voice mail system as to the time that the 911 call was placed and the telephone number from which the 911 call was placed. The service stops dialing the selected telephone numbers once an announcement has been played to an answering machine or a voice mail system. If the service has not reached a live person, an answering machine, or a voice mail system within the first twenty-four hours following the placement of the 911 call, the service stops dialing the selected telephone numbers.

There are several shortcomings associated with Lucent's family 911 notification service. For example, the means used to provision the selected telephone numbers add complexity and cost to the service, the hardware used to implement the service is relatively expensive to acquire and maintain, and the service only offers oral notification that a 911 call has been placed. Thus, there exists a need for an emergency notification system that overcomes the limitations, shortcomings, and disadvantages of the emergency notification system described hereinabove.

BRIEF SUMMARY OF THE INVENTION

The present invention meets the identified need, as well as other needs, as will be more fully understood following a review of this specification and the accompanying drawings. The present invention is directed to an emergency notification system. The system includes a first server for receiving an emergency communication from a telecommunications network and for transmitting a message to a subscriber of the emergency notification system; and a second server in communication with the first server, the second server for supplying the first server with information associated with a subscriber.

BRIEF DESCRIPTION OF THE DRAWINGS

For the present invention to be clearly understood and readily practiced, the present invention will be described in conjunction with the following figures, wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, other elements of a conventional telecommunications network. For example, certain operating system details and modules of certain of the intelligent platforms of the network are not described herein. Those of ordinary skill in the art will recognize, however, that these and other elements may be desirable in a typical telecommunications network. However, because such elements are well known in the art, and because they do not facilitate a better understanding of the present invention, a discussion of such elements is not provided herein.

The term "calling party" is used herein generally to refer to the person or unit that initiates a telecommunication. The calling party may also be referred to herein as "caller." The term "called party" is used herein generally to refer to the person or unit that answers or responds to the call or communication. In some cases the calling party or the called party may not be a person, but may be a device such as an answering machine, a voice mail system, etc. The term "communication" is used herein to include all messages or calls that may be exchanged between a calling party and a called party, including voice, data and video messages. The term "communication" is used synonymously herein with the term "call" unless a distinction is noted. The term "subscriber" is used herein to generally refer to a subscriber of the described emergency notification service.

The present invention is directed to an emergency notification system. According to one embodiment, the emergency notification system utilizes the intelligent functionality of an Advanced Intelligent Network (AIN). The AIN is a network used to provide enhanced voice and data services and dynamic routing capabilities to a conventional telephone network. With AIN, the actual voice call is still transmitted over a circuit-switched network but the signaling and control takes place on a separate packet-switched network. Before describing details of the system of the present invention, a high-level description of an AIN is provided.

Figure 1:
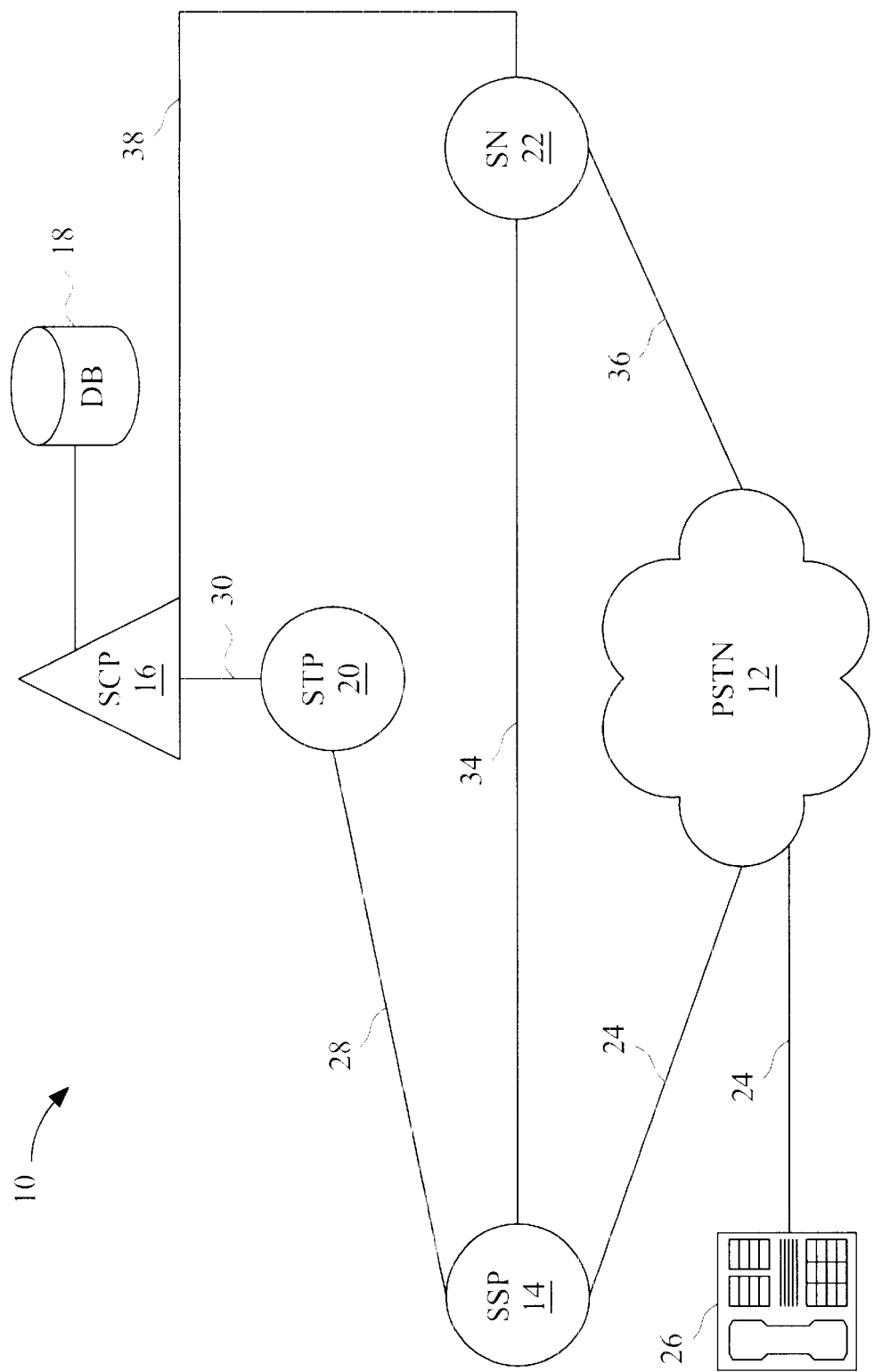
FIG. 1 is a block diagram of an Advanced Intelligent Network (AIN) for a public switched telephone network.

FIG. 1 is a block diagram of an Advanced Intelligent Network (AIN) 10. The AIN 10 may be employed by a Local Exchange Carrier (LEC), and may be utilized by the LEC to allow the LEC to provide call processing features and services that are not embedded within conventional switching circuits of a conventional telephone system such as, for example, the Public Switched Telephone Network (PSTN) 12. As illustrated in FIG. 1, the AIN 10 includes a Service Switching Point (SSP) 14, a Signal Control Point (SCP) 16, a database 18, a Signal Transfer Point (STP) 20, and a Service Node (SN) 22.

In a conventional telephone system, central office (CO) switches are used to interconnect customer premises equipment (i.e., terminal equipment such as telephones, modems, or answering machines that are connected to the telephone network and reside on the customer's premises). For the AIN 10 illustrated in FIG. 1, the SSP 14 is a switch used to interconnect customer premises equipment via the PSTN 12. The difference between the SSP 14 and the CO switch of a conventional telephone system is that the SSP 14 provides intelligent network functionality.

The SSP 14 has one or more subscriber lines 24 connected thereto. The subscriber lines 24 may be, for example, local loops comprising conventional twisted pair loop circuits connected between the SSP 14 and the customer premises, or the subscriber lines 24 may be trunk circuits, such as T-1 trunk circuits. The number of subscriber lines 24 connected to an SSP 14 may be on the order of ten thousand to one hundred thousand lines. The subscriber line 24 is connected to a terminating piece of customer premises equipment, represented in FIG. 1 by a landline telephone 26. Alternatively, the terminating equipment may be any other type of communications unit such as, for example, a telecopier, a personal computer, a modem, an answering machine, or a private branch exchange (PBX) switching system.

The SCP 16 is a server associated with a database 18, and provides instructions to the SSP 14 and the SN 22 as requested and required. The SCP 16 may be an intelligent database server such as, for example, an Intelligent Network Service Control Point available from Lucent Technologies Inc., Murray Hill, N.J. The database 18 is for storing customer information used in providing enhanced calling services, such as the service provided by the emergency notification system of the present invention, and may reside at the SCP 16. The intelligent functionality of the SCP 16 may be realized by application programs, such as programmable Service Program Applications (SPA), which are executed by the SCP 16. Although the AIN 10 illustrated in FIG. 1 only shows one database 18 associated with the SCP 16, it is understood that more than one database 18 may be associated with the SCP 16.

The STP 20 is a packet switch that routes signaling and control messages between the SSP 14 and the SCP 16. As illustrated in FIG. 1, the STP 20 is in communication with the SSP 14 via communication link 28 and with the SCP 16 via communication link 30. Communication links 28, 30 may employ, for example, the Signaling System 7 (SS7) signaling protocol.

The SN 22 may provide an enhanced feature or service that requires an audio connection between the SN 22 and an answering machine connected to a subscriber line 24, or between the SN 22 and a landline telephone 26 from which an emergency communication has been placed. The SN 22 may be any type of AIN-compliant service node, and may be, for example, a Compact Services Node (CSN) available from Lucent Technologies Inc., Murray Hill, N.J. Similar to the SCP 16, the intelligent functionality of the SN 22 may be realized by programmable applications executable by the SN 22.

The SN 22 is in communication with the SSP 14 via communication link 34, with the PSTN 12 via communication link 36, and with the SCP 16 via communication link 38. Communication links 34 and 36 may be, for example, an Integrated Service Digital Network (ISDN) Primary Rate Interface (PRI), an ISDN Basic Rate Interface (BRI), or a T-1 trunk circuit. Communication link 38 may be, for example, a portion of a communication network such as, for example, a Local Area Network (LAN), a Metropolitan Area Network (MAN), or a Wide Area Network (WAN).

The basic operation of the AIN 10 illustrated in FIG. 1 is described hereinbelow. When a call originating from the landline telephone 26 is received at the SSP 14 via the PSTN 12, the SSP 14 generates a query to determine how the call should be processed. The query generated by the SSP 14 is transmitted via out-of-band signaling through the STP 20 to the SCP 16.

The SCP 16 interprets the query based on information provided by the SSP 14 and information stored in the database 18 to determine whether some customized call feature or enhanced service should be implemented for the particular call, or whether conventional dial-up telephone service should be provided. The information provided by the SSP 14 may include, for example, the originating telephone number, the name of the calling party, and the telephone number dialed by the calling party. The information stored in the database 18 may include, for example, routing instructions associated with the dialed telephone number. Once the SCP 16 determines how the call is to be processed, it returns a message through the STP 20 to the SSP 14 instructing the SSP 14 how the call should be processed. The instructions may be to take some special action as a result of a customized calling service or enhanced feature. For example, for an enhanced calling feature requiring the capabilities of the SN 22, the return message from the SCP 16 may include instructions for the SSP 14 to route the call to the SN 22. In addition, the return message from the SCP 16 may simply be an indication that there is no entry in the database 18 that indicates anything other than conventional telephone service should be provided for the call. The query and return messages may be formatted, for example, according to conventional SS7 TCAP (Transaction Capabilities Application Part) formats.

Although the AIN 10 illustrated in FIG. 1 includes only one SSP 14, one SCP 16, one database 18, one STP 20, and one SN 22, it is understood that the AIN 10 may further include an additional number of these components as well as other network components that are not included in FIG. 1 for purposes of clarity. For example, the AIN 10 may additionally include redundant SCP's and STP's to take over if the SCP 16 or the STP 20 should fail. Further, the AIN 10 may include regional STP's and regional SCP's in communication with, for example, the local STP 20, for routing and servicing calls between different LECs.

Figure 2:
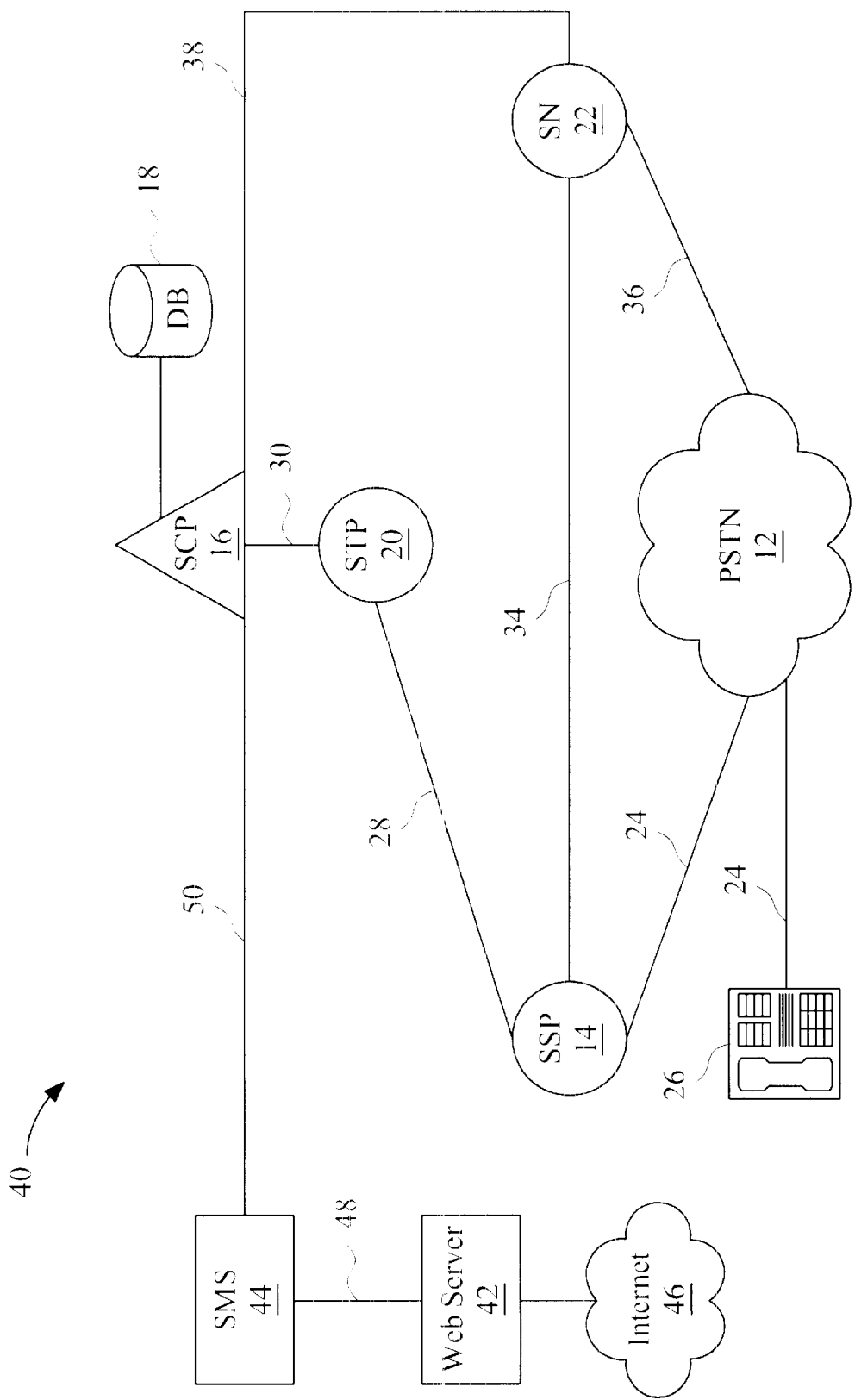
FIG. 2 illustrates a prior art emergency notification system.

FIG. 2 illustrates a system 40 employed by an emergency notification service, such as the Lucent family 911 notification service. The system 40 includes the AIN 10 as described hereinabove with regard to FIG. 1, and also includes a web server 42 and a Service Management System (SMS) 44. The web server 42 is connected to the Internet 46, and is in communication with the SMS 44 via communication link 48. Communication link 48 may be, for example, a portion of the communication network that includes communication link 38.

The SMS 44 is an operations support system used to facilitate the provisioning and administration of service data required by the SCP 16. The SMS 44 includes a network server and a database, and may be used to centralize and manage the service logic and customer data residing at the SCP 16. The SMS 44 includes programmable applications executable by the SMS 44 that provide access to the service management functions of the SMS 44 such as, for example, subscriber provisioning, and provide a direct interface to the SMS database. The SMS 44 is in communication with the SCP 16 via communication link 50. Communication link 50 may be, for example, a portion of the communication network that includes communication link 38.

When a customer subscribes to the emergency notification service, the service is provisioned at the SCP 16. Information provisioned at the SCP 16 may include the name of the customer, the customer's landline telephone number, and the telephone numbers that the customer wishes to be called when a 911 call originates from the customer's landline telephone number. The customer may designate up to five telephone numbers that the customer wishes to be called when a 911 call originates from the customer's landline telephone number. A system administrator may provision the service by entering the information via the SMS 44, which in turn passes the information to the SCP 16, which then populates the database 18 with the information. Alternatively, the subscriber may provision the service remotely via the Internet 46 by providing the information to the web server 42, which in turn passes the information to the SMS 44 for provisioning at the SCP 16 as described hereinbefore.

When a 911 call is placed from the customer's landline telephone 26, the call is passed to the SSP 14 via the subscriber line 24 connecting the landline telephone 26 to the SSP 14. The call activates a trigger defined at the SSP 14, resulting in a query message being sent to the SCP 16 via the STP 20. A trigger is an event associated with a particular subscriber line 24 that causes the SSP 14 to query the SCP 16 for instructions as to how to process the call. A trigger may be an originating trigger for a call originating from the customer premises or a terminating trigger for a call terminating at the customer premises. The query message includes a caller ID message giving the customer's telephone number, and the date and time that the 911 call was made. The caller ID message may also include the name of the customer. The SCP 16 receives the query message and returns a response message to the SSP 14 via the STP 20. The response message instructs the SSP 14 to process the 911 call as a switch-based feature. The SSP 14 then routes the 911 call to a Public Safety Answering Point (PSAP), where a PSAP operator verifies or obtains the caller's location, determines the nature of the emergency, and decides the appropriate emergency response. For example, the PSAP operator may dispatch help directly, or may transfer the caller to a secondary PSAP from which help will be dispatched. Secondary PSAP's are typically located at fire dispatch areas, municipal police force headquarters, or ambulance dispatch centers.

In addition to returning the response message to the SSP 14, the SCP 16 also uses the information provided by the query message to search the database 18 to determine if the customer is a subscriber to the family 911 notification service. If the customer is subscribed to the service, the calling of the designated telephone numbers is initiated. If the calling is initiated, the SCP 16 makes a TCP/IP connection request to the SN 22. Once the TCP/IP connection is established between the SCP 16 and the SN 22, the SCP 16 transmits information to the SN 22. The information includes the telephone number from which the 911 call was made, the time and date of the 911 call, and the designated telephone numbers to be notified for the subscriber. Once the information has been received at the SN 22, the TCP/IP connection between the SCP 16 and the SN 22 is released.

The SN 22 will then begin placing outgoing calls to the designated telephone numbers in a sequential manner. As described hereinbefore, if the SN 22 reaches a live person at one of the designated telephone numbers, the SN 22 announces that the incoming call is from the family 911 notification service, that a 911 call was placed, the telephone number from which the 911 call was placed, and the time that the 911 call was placed. The SN 22 stops dialing the designated telephone numbers once the announcement has been played to a live person. If the SN 22 has not reached a live person after all of the designated numbers have been called, the SN 22 waits for five minutes before beginning to call the designated telephone numbers again. This process repeats itself for the first hour following the placement of the 911 call. During the first hour, if the SN 22 reaches an answering machine or a voice mail system at one of the designated telephone numbers, the SN 22 does not transmit the announcement.

If the SN 22 has not reached a live person within the first hour, the SN 22 continues to call the designated telephone numbers according to the specified priority. However, if the SN 22 reaches an answering machine or a voice mail system after the first hour, the SN 22 transmits an announcement that the incoming call is from the family 911 notification service, that the service has been trying to reach the person associated with the designated telephone number to notify them that a 911 call has been placed, the telephone number from which the 911 call was placed, and the time that the call was placed. The SN 22 stops dialing the designated telephone numbers once this announcement has been played to an answering machine or a voice mail system. If the service has not reached a live person, an answering machine, or a voice mail system within the first twenty-four hours following the placement of the 911 call, the SN 22 stops dialing the designated telephone numbers.

One skilled in the art will recognize several shortcomings associated with the above-described system 40. For example, all of the subscriber information needed to operate the notification service must be provisioned via the SMS 44, adding cost and complexity to the system 40. Furthermore, storing this information at the SCP 16 requires increased storage capacity at the SCP 16, resulting in increased acquisition and maintenance costs. In addition, the SN 22 employed in the system 40 is a very expensive network element, often having an initial purchase price of approximately one-half million dollars.

Figure 3:
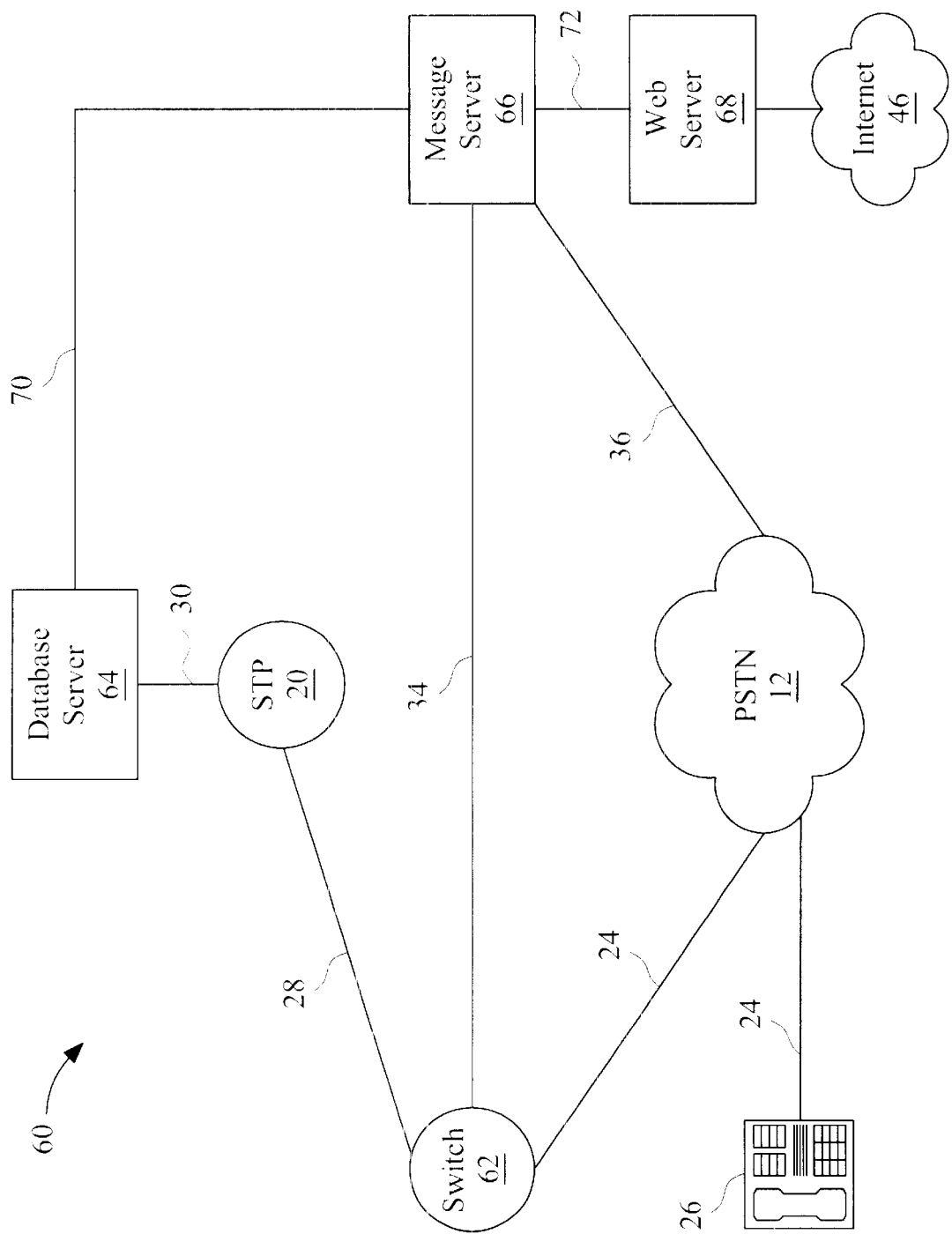
FIG. 3 illustrates an emergency notification system according to one embodiment of the present invention.

FIG. 3 illustrates an emergency notification system according to one embodiment of the present invention. The system 60 includes a switch 62, a database server 64, a message server 66, and a web server 68. The system 60 also includes an STP 20 as described hereinbefore. The system 60 is used to provide an emergency notification service that transmits a message that an emergency communication was placed from terminal equipment associated with a subscriber to the service.

The switch 62 may be in communication with terminal equipment such as, for example, a landline telephone 26 associated with the subscriber via a subscriber line such as, for example, subscriber line 24. According to one embodiment, the switch 62 may be a service switching point such as, for example, the SSP 14 as described hereinabove. The switch 62 may include an originating trigger such as, for example, an N11 trigger, and the N11 trigger may be, for example, a 911 trigger. The switch 62 may also be in communication with the STP 20 via communication link 28 and with the message server 66 via communication link 34.

The database server 64 is in communication with the switch 62 via the STP 20 and communication links 28 and 30, and may be a service control point similar to the SCP 16 described hereinbefore. The database server 64 may store call-processing instructions, and may supply instructions to the switch 62 concerning how to process an incoming call. For example, according to one embodiment, the database server 64 may supply the switch with instructions for processing an emergency communication received at the switch 62. Although the database server 64 may be similar to the SCP 16, the database server 64 is markedly different from the SCP 16 in that the database server 62 does not maintain the provisioned subscriber information (i.e., subscriber name, subscriber telephone number, telephone numbers to be called, etc.) associated with the emergency notification service. Therefore, the database server 64 may be provided with less storage capacity and require less database maintenance than the SCP 16. Accordingly, the database server 64 may have a lower initial cost than the SCP 16 and have lower maintenance costs associated therewith.

The database server 64 may also supply information associated with an incoming call to the message server 66. For example, the database server 64 may supply the message server 66 with information associated with an emergency communication. Such information may have been provided to the database server 64 by the switch 62 and may include, for example, the name of the person associated with a subscriber line 24 from which the emergency communication originated, the telephone number from which the emergency communication originated, and the date and time that the emergency communication was received at the switch 62.

The message server 66 is in communication with the database server 64 via communication link 70, and may transmit a message after an emergency communication is received at the switch 62. The message server 66 may be any type of low-cost computer suitable for transmitting an oral message and/or a textual message. Whereas the SN 22 employed in system 40 has an initial cost of approximately one-half million dollars, the message server 66 only has an initial cost of approximately ten-thousand dollars. According to one embodiment, the message server 66 may be a telephony server that may transmit an oral message. According to another embodiment, the message server 66 may be an electronic mail server that may transmit a textual message. Communication link 70 may be, for example, a portion of a communication network such as, for example, a Local Area Network (LAN), a Metropolitan Area Network (MAN), or a Wide Area Network (WAN). The message server 66 may also be in communication with the PSTN 12 via communication link 36.

The web server 68 is in communication with the message server 66 via communication link 72, and may supply the message server 66 with information associated with a subscriber to an emergency notification service. Communication link 72 may be, for example, a portion of the communication network that includes communication link 70. The web server 68 may be connected to the Internet 46, and the subscriber information may be remotely provisioned and maintained at the web server 68 via the Internet 46. Such subscriber information may include, for example, the subscriber's name, a telephone number associated with the subscriber, designated telephone numbers, and designated electronic mail addresses. Designated telephone numbers may be provisioned to receive a notification in the form of an oral message, and designated electronic mail addresses may be provisioned to receive a notification in the form of a textual message, if an emergency communication is placed from terminal equipment associated with the subscriber. More than five telephone numbers and more than five electronic mail addresses may be provisioned at the web server 68. Provisioning subscriber information directly to the web server 68 reduces the cost and complexity of the emergency notification system.

Figure 4A:
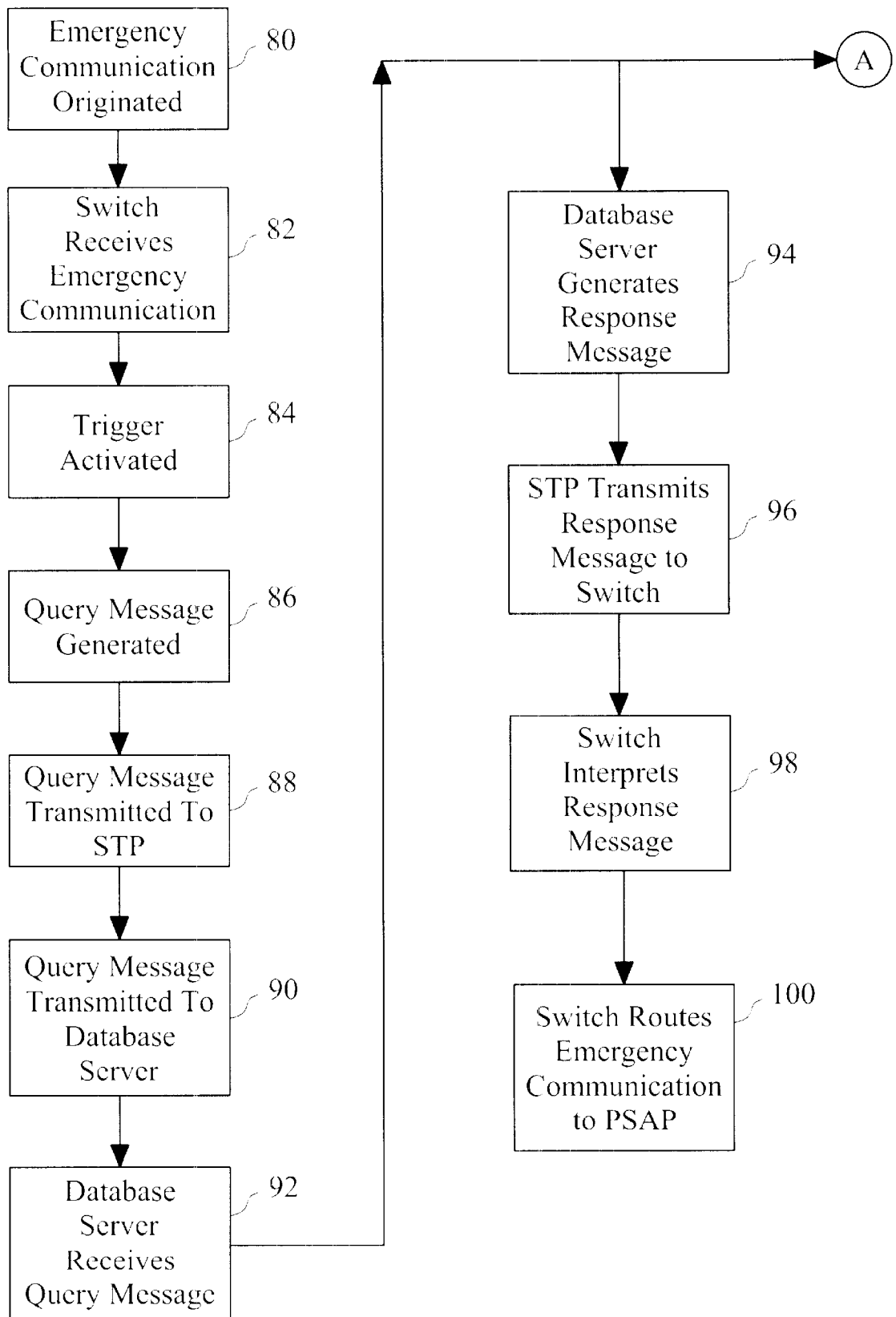
FIGS. 4A and 4B illustrate an embodiment of a process flow of the emergency notification system of FIG. 3.
Figure 4B:
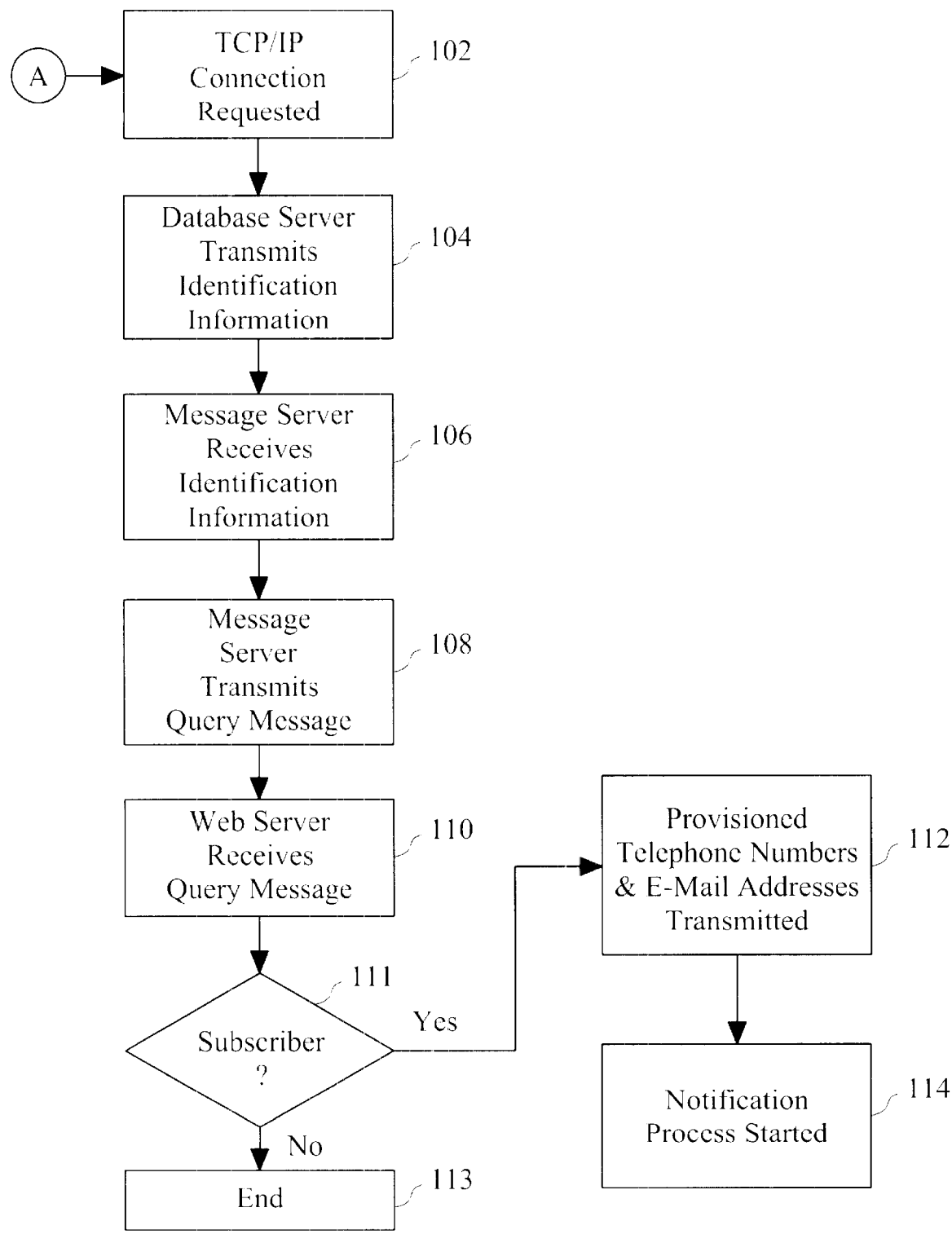

FIGS. 4A and 4B illustrate an embodiment of a process flow of the emergency notification system 60 of FIG. 3. After the subscriber information has been provisioned at the web server 68 via the Internet 46, the emergency notification service becomes operational for the subscriber. The process begins at block 80, where an emergency communication is originated from customer premises equipment. The customer premises equipment may be, for example, a landline telephone 26 connected to a subscriber line 24.

From block 80, the process proceeds to block 82, where the switch 62 receives the emergency communication via the PSTN 12. From block 82, the process proceeds to block 84, where the received emergency communication activates a trigger defined at the switch 14. The trigger may be an originating trigger such as, for example, an N11 trigger, and the N11 trigger may be, for example, a 911 trigger. From block 84, the process proceeds to block 86, where the activated trigger causes the switch 62 to generate a query message to determine how the emergency communication should be processed. The query message may include identification information such as, for example, the telephone number that the emergency communication originated from, the name of the person associated with the telephone number, and the date and time the emergency communication was received at the switch 62, etc. From block 86, the process proceeds to block 88, where the switch 62 transmits the query message to the STP 20 via communication link 28. From block 88, the process proceeds to block 90, where the STP 20 receives the query message and transmits the query message to the database server 64 via communication link 30. From block 90, the process proceeds to block 92, where the database server 64 receives the query message originated at the switch 62.

From block 92, the process proceeds to block 94, where the database server 64 generates a response message to the query message and transmits the response message to the STP 20 via communication link 30. The response message includes an instruction detailing how the switch 62 should process the emergency communication. For example, the response message may include an instruction for the switch 62 to process the emergency communication as a switch-based feature. From block 94, the process proceeds to block 96, where the STP 20 receives the response message from the database server 64 and transmits the response message to the switch 62 via communication link 28. From block 96, the process proceeds to block 98, where the switch 62 receives and interprets the response message originated at the database server 64. From block 98, the process proceeds to block 100, where the switch 62 routes the emergency communication to a Public Safety Answering Point (PSAP), where a PSAP operator processes the call in accordance with well-known procedures.

While the process is proceeding from block 92 to block 94, the process also proceeds from block 92 to block 102, where the database server 64 requests a TCP/IP connection be established between the database server 64 and the message server 66. Once the TCP/IP connection has been established, the process proceeds from block 102 to block 104, where the database server 64 transmits the identification information included in the query message to the message server 66 via communication link 70. From block 104, the process proceeds to block 106, where the message server 66 receives the identification information, and requests that a TCP/IP connection be established between the message server 66 and the web server 68. Once the TCP/IP connection has been established, the process proceeds from block 106 to block 108, where the message server 66 transmits a query message to the web server 68 via communication link 72 to determine whether the person associated with the telephone number that the emergency communication originated from has been provisioned as a subscriber to the emergency notification service. From block 108, the process proceeds to block 110, where the web server 68 receives the query message and at step 111 determines whether the person has been provisioned as a subscriber to the service. If the person has not been provisioned as a subscriber to the emergency notification service, the process ends at step 113.

If the person has been provisioned as a subscriber to the emergency notification service, the process proceeds from block 111 to block 112, where the web server 68 transmits the provisioned telephone numbers and electronic mail addresses to the message server 66 via communication link 72. From block 112, the process proceeds to block 114, where the message server 66 receives the provisioned telephone numbers and electronic mail addresses, and starts the notification process by placing outgoing calls to the provisioned telephone numbers via the PSTN 12, and/or transmitting textual messages to the provisioned electronic mail addresses over the Internet 46 via the web server 68. Depending on how the subscriber has provisioned the service, the outgoing calls may be placed simultaneously or in a sequential order specified by the subscriber, and the electronic mail messages may be transmitted simultaneously or in a sequential order specified by the subscriber. According to one embodiment, the outgoing calls are placed concurrently with the transmission of the electronic mail messages.

For outgoing calls that are answered by a live person, an answering machine, or a voice mail system, the message server 66 may play an announcement that the call is from an emergency notification service, that the service has received an emergency communication originated from a telephone number associated with the subscriber, the name of the subscriber, and the date and time the emergency communication was received. Once an outgoing call has been answered at a provisioned telephone number, and the message server 66 has played the announcement, the message server 66 will stop calling that particular telephone number. If an outgoing call has not been answered at a provisioned telephone number, the message server 66 may continue to call the provisioned telephone number until the call has been answered and the announcement has been played.

Electronic mail messages transmitted by the message server 66 to the provisioned electronic mail addresses may include a textual message notifying the person associated with the electronic mail address that the message is from an emergency notification service, that the service has received an emergency communication originated from a telephone number associated with the subscriber, the name of the subscriber, and the date and time the emergency communication was received. The message server 66 may transmit the electronic mail messages once to each provisioned electronic mail address. However, if the message server 66 receives an indication that the electronic mail message was not delivered successfully to a particular provisioned electronic mail address, the message server 66 may attempt to transmit the electronic mail message to the particular provisioned electronic mail address more than once.

Although the present invention has been described and illustrated in detail herein with respect to certain embodiments, it is clearly understood that the same is by way of example and is not to be taken by way of limitation. It will be appreciated by those of ordinary skill in the art that numerous modifications and variations of the present invention may be implemented without departing from the spirit and scope of the present invention as described in the appended claims.

What is claimed is:

1. An emergency notification system, comprising:
   a switch;
   a first server in communication with the switch, wherein the first server is for transmitting information associated with an emergency communication received at the switch;
   a second server in communication with the first server, wherein the second server is for receiving the information transmitted from the first server; and
   a third server in communication with the second server, wherein the third server is for supplying the second server with information associated with a subscriber, and wherein the second server is for transmitting a notification message after receiving the information associated with the subscriber.

2. The system of claim 1, wherein the switch includes a service switching point.

3. The system of claim 1, wherein the switch includes an originating trigger.

4. The system of claim 3, wherein the trigger includes a 911 trigger.

5. The system of claim 1, wherein the first server includes a service control point.

6. The system of claim 1, wherein the second server includes a telephony server.

7. The system of claim 1, wherein the second server includes an electronic mail server.

8. The system of claim 1, wherein the third server is in communication with the Internet.

* * * * *